(No Model.)
P. CONNOLLY.
STATIONARY WASH STAND.
No. 260,371. Patented July 4, 1882.
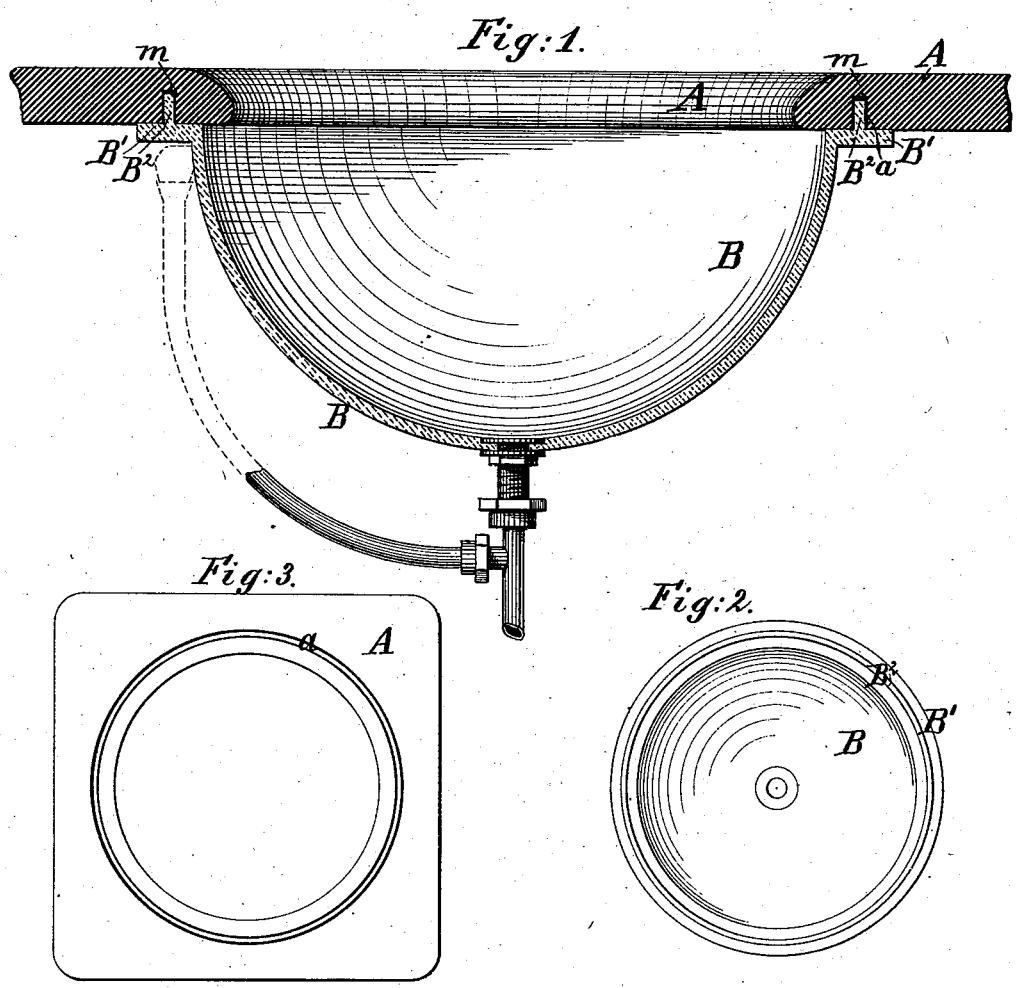

UNITED STATES PATENT OFFICE.

PATRICK CONNOLLY, OF BROOKLYN, NEW YORK, ASSIGNOR, BY MESNE ASSIGNMENTS, TO JULIA CONNOLLY, OF SAME PLACE.

STATIONARY WASH-STAND.

SPECIFICATION forming part of Letters Patent No. 260,371, dated July 4, 1882.

Application filed October 8, 1881. (No model.)

*To all whom it may concern:*

Be it known that I, PATRICK CONNOLLY, of Brooklyn, in the county of Kings, in the State of New York, have invented certain new and useful Improvements relating to Stationary Wash-Stands, of which the following is a specification.

It is usual to employ a bowl or basin of crockery, with a sufficiently-wide flange at the top, having a plane upper surface.

I employ the same materials, the same general arrangement, and the same form and proportions of the parts, with the exception of a circular lip extended around on the upper face about the mid-width of the flange, and a corresponding groove in the under face of the marble.

It has been before proposed to employ a lip on the extreme outer edge of the flange. Such will not serve the same as mine.

My lip not only forms a bar against the flow of the water and increases the surfaces to be cemented, but is so arranged that the flange holds up the plaster on both sides of the lip and insures the retention of a liberal quantity to fill the entire joint.

The accompanying drawings form a part of this specification and represent what I consider the best means of carrying out the invention.

Figure 1 is a central vertical section through the basin with its lipped flange, and through the adjacent portion of the marble. Figs. 2 and 3 represent parts detached. Fig. 2 is a top view of the basin, and Fig. 3 is a bottom view of the marble slab.

Similar letters of reference indicate corresponding parts in all the figures.

A is the top slab of marble, and $a$ a circular or approximately circular groove cut therein. The lower face of the marble and also the surfaces of the groove are left rough.

B is the body of the basin.

B' is a horizontal flange extending outward from the top rim.

$B^2$ is a lip formed on the upper face of the flange B and from the same material.

The upper surface of the flange B' and all the surfaces of the lip $B^2$ are left rough or unglazed.

It will be understood that the groove $a$ in the marble is wider and deeper than the lip $B^2$. On applying the parts together a sufficient quantity of plaster, $m$, is applied on the surfaces, and as the parts are pressed firmly together the plaster fills all the spaces and cements the whole tightly. The ordinary clamps (not represented) bind the parts firmly together.

The lip $B^2$ is formed in the clay when the vessel is turned on the potter's wheel or otherwise molded. The groove $a$ in the marble may be cut by hand with a chisel at any period of the manufacture of the slab or after the slab is otherwise finished. A warping of the basin in the burning may throw the lip $B^2$ out of an absolute circle. In such case the groove should be correspondingly distorted. I recommend that the basin be held temporarily in the proper position against the marble and a black-lead pencil or other marking device be swept around to describe on the marble the outline of the lip $B^2$. This pencil-mark serves as a guide in cutting the groove, and will have either the exact or approximate roundness desired.

The lip $B^2$ being presented, each side of the lip $B^2$ serves to hold up the plaster and insure that a liberal quantity is presented and retained in the groove $a$ and on both sides of it. Strong cements, which are available for many other purposes, cannot be used in stationary hand-basins. Calcined plaster freshly wetted seems to be the only available cement. Its adhesion is not great, but my invention enables it to succeed perfectly and holds up the cement so effectually as to insure against any passage of the water under any circumstances.

It will be understood that the connections for the plumbing may be of any ordinary or suitable character. The materials may be varied.

I claim as my invention—

The stationary wash-stand described, having the grooved slab A $a$ and cementing material $m$, in combination with the bowl or basin B, having the lip $B^2$, arranged centrally in a plane surface, B', connected with the bowl and arranged to serve as herein specified.

In testimony whereof I have hereunto set my hand at New York city, in the presence of two subscribing witnesses.

P. CONNOLLY.

Witnesses:
WM. C. DEY,
CHARLES C. STETSON.